US008229091B2

United States Patent
Romeo

(10) Patent No.: US 8,229,091 B2
(45) Date of Patent: *Jul. 24, 2012

(54) INTERACTIVE VOICE RESPONSE TO SHORT MESSAGE SERVICE TEXT MESSENGER

(75) Inventor: John P. Romeo, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 618 days.

This patent is subject to a terminal disclaimer.

(21) Appl. No.: 12/420,989

(22) Filed: Apr. 9, 2009

(65) Prior Publication Data

US 2009/0196405 A1    Aug. 6, 2009

Related U.S. Application Data

(63) Continuation of application No. 11/173,883, filed on Jul. 1, 2005, now Pat. No. 7,526,073.

(51) Int. Cl.
*H04M 11/06* (2006.01)
*G06F 17/00* (2006.01)
*G01S 5/02* (2010.01)

(52) U.S. Cl. ............. 379/88.18; 342/457; 342/465; 379/88.14; 379/93.23; 379/209.01; 455/466; 463/17

(58) Field of Classification Search .......... 370/310; 379/88.14, 88.16, 88.17, 88.18, 88.23, 88.24, 379/211.01, 265.07, 266.07, 93.23, 209.01; 455/466; 709/207; 342/457, 465; 463/17
See application file for complete search history.

(56) References Cited

U.S. PATENT DOCUMENTS

| | | | | |
|---|---|---|---|---|
| 5,146,487 | A * | 9/1992 | Bergsman et al. | 379/88.24 |
| 5,787,151 | A * | 7/1998 | Nakatsu et al. | 379/88.23 |
| 5,943,399 | A * | 8/1999 | Bannister et al. | 379/88.17 |
| 5,950,123 | A | 9/1999 | Schwelb et al. | |
| 5,995,590 | A | 11/1999 | Brunet et al. | |
| 6,203,192 | B1 * | 3/2001 | Fortman | 379/88.14 |
| 6,351,522 | B1 | 2/2002 | Vitikainen | |
| 6,389,114 | B1 | 5/2002 | Dowens et al. | |
| 6,404,860 | B1 * | 6/2002 | Casellini | 379/88.17 |
| 6,421,707 | B1 | 7/2002 | Miller et al. | |
| 6,456,616 | B1 | 9/2002 | Rantanen | |
| 6,483,899 | B2 * | 11/2002 | Agraharam et al. | 379/88.14 |
| 6,507,643 | B1 * | 1/2003 | Groner | 379/88.14 |
| 6,529,592 | B1 | 3/2003 | Khan | |
| 6,529,737 | B1 * | 3/2003 | Skinner et al. | 455/466 |
| 6,603,428 | B2 * | 8/2003 | Stilp | 342/457 |

(Continued)

FOREIGN PATENT DOCUMENTS

EP    0 946 032 A3    9/1999

(Continued)

OTHER PUBLICATIONS

Rossfrank, "Konstenlose Sprachmitteilungins Festnetz", Dec. 10, 2000, 4 pages, Germany.

*Primary Examiner* — Gerald Gauthier

(74) *Attorney, Agent, or Firm* — Toler Law Group, PC

(57) ABSTRACT

A method is disclosed that includes receiving a selection of an interactive voice response (IVR) option. The method also includes receiving, at an IVR system, a first spoken message. The first spoken message is translated, at a translator, into a short message service (SMS) text message.

20 Claims, 1 Drawing Sheet

U.S. PATENT DOCUMENTS

| | | | |
|---|---|---|---|
| 6,603,837 B1 | 8/2003 | Kesanupalli et al. | |
| 6,646,604 B2 * | 11/2003 | Anderson | 342/465 |
| 6,757,365 B1 | 6/2004 | Bogard | |
| 6,760,412 B1 | 7/2004 | Loucks | |
| 6,763,089 B2 | 7/2004 | Feigenbaum | |
| 6,775,360 B2 * | 8/2004 | Davidson et al. | 379/88.14 |
| 6,790,704 B2 | 9/2004 | Doyle et al. | |
| 6,792,086 B1 | 9/2004 | Saylor et al. | |
| 6,801,604 B2 | 10/2004 | Maes et al. | |
| 6,816,578 B1 | 11/2004 | Kredo et al. | |
| 6,895,084 B1 | 5/2005 | Saylor et al. | |
| 6,907,112 B1 | 6/2005 | Guedalia et al. | |
| 6,931,255 B2 | 8/2005 | Mekuria | |
| 6,934,756 B2 | 8/2005 | Maes | |
| 6,956,831 B1 * | 10/2005 | Mahr | 370/310 |
| 7,024,460 B2 | 4/2006 | Koopmas et al. | |
| 7,027,568 B1 | 4/2006 | Simpson et al. | |
| 7,054,419 B2 | 5/2006 | Culliss | |
| 7,065,185 B1 | 6/2006 | Koch | |
| 7,092,370 B2 | 8/2006 | Jiang et al. | |
| 7,095,733 B1 | 8/2006 | Yarlagadda et al. | |
| 7,113,803 B2 | 9/2006 | Dehlin | |
| 7,174,297 B2 | 2/2007 | Guerra et al. | |
| 7,245,711 B2 * | 7/2007 | Margolis | 379/209.01 |
| 7,310,329 B2 | 12/2007 | Vieri et al. | |
| 7,707,262 B1 * | 4/2010 | Bill | 709/207 |
| 7,751,551 B2 * | 7/2010 | Bushey et al. | 379/265.02 |
| 7,894,597 B2 * | 2/2011 | Walker et al. | 379/266.07 |
| 2002/0062393 A1 | 5/2002 | Borger et al. | |
| 2002/0085701 A1 * | 7/2002 | Parsons et al. | 379/211.01 |
| 2003/0028380 A1 | 2/2003 | Freeland et al. | |
| 2003/0162580 A1 * | 8/2003 | Cousineau et al. | 463/17 |
| 2004/0186777 A1 | 9/2004 | Margiloff et al. | |
| 2004/0208302 A1 | 10/2004 | Urban et al. | |
| 2005/0033771 A1 | 2/2005 | Schmitter et al. | |
| 2005/0086316 A1 | 4/2005 | Chen | |
| 2005/0136949 A1 | 6/2005 | Barnes, Jr. | |
| 2007/0121846 A1 | 5/2007 | Altberg et al. | |
| 2007/0130014 A1 | 6/2007 | Altberg et al. | |
| 2007/0162296 A1 | 7/2007 | Altberg et al. | |
| 2008/0010355 A1 | 1/2008 | Vieri et al. | |
| 2008/0051120 A1 | 2/2008 | Vieri et al. | |
| 2009/0030775 A1 | 1/2009 | Vieri | |

FOREIGN PATENT DOCUMENTS

| | | |
|---|---|---|
| JP | 2000134407 | 5/2000 |
| KR | 1020020004337 A | 1/2002 |
| WO | 00/19697 A1 | 4/2000 |
| WO | 03/041364 A2 | 5/2003 |
| WO | 2005/003920 A2 | 1/2005 |

* cited by examiner

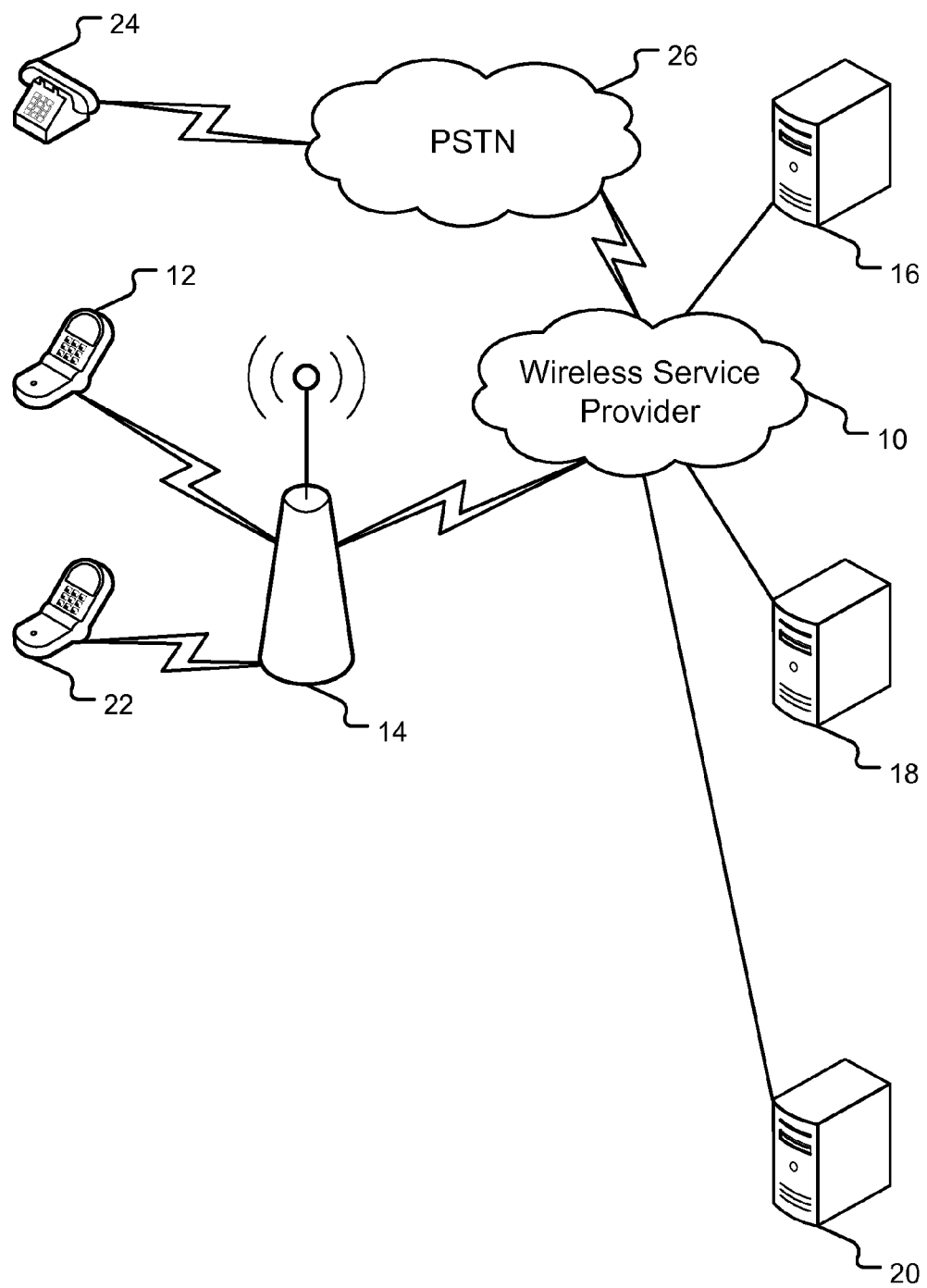

INTERACTIVE VOICE RESPONSE TO SHORT MESSAGE SERVICE TEXT MESSENGER

CLAIM OF PRIORITY

The present application claims priority from and is a continuation of patent application Ser. No. 11/173,883 filed on Jul. 1, 2005 and entitled "IVR TO SMS TEXT MESSENGER," the contents of which are expressly incorporated herein by reference in their entirety.

FIELD OF THE DISCLOSURE

The present disclosure relates to telecommunications, and in particular to an enhanced text messenger in a telecommunications network.

BACKGROUND

Short Message Service (SMS) is a popular wireless telephone feature with which a subscriber enters a short text message with their cell phone keypad and sends the message to a recipient after entering the telephone number of the recipient. The recipient is alerted to the incoming message and the text message is displayed on the display screen of the recipient's phone.

In certain circumstances, however, such as while driving, keying a text message into the phone is difficult or outright dangerous. Additionally, visually impaired persons may find it difficult to visually confirm that they entered a message in correctly. It would be useful, therefore, to have a text messenger solution that allowed a user to create and send a text message by speaking into the phone. The present disclosure provides such a solution.

BRIEF DESCRIPTION OF THE DRAWINGS

The present disclosure is further described in the detailed description that follows, by reference to the noted drawings, by way of non-limiting examples of embodiments of the present invention, in which reference numerals represent the same parts throughout the several views of the drawings, and in which:

FIG. 1 is schematic drawing of a specific exemplary embodiment of an IVR SMS messenger system.

DETAILED DESCRIPTION

In a particular embodiment, a method is disclosed that includes receiving a selection of an interactive voice response (IVR) option. The selection of the IVR option is detected at a first telecommunications terminal. The method also includes receiving, at an IVR system, a first spoken message. The method also includes translating, at a translator, the first spoken message into a short message service (SMS) text message.

In another particular embodiment, a computer-readable storage medium is disclosed. The computer-readable storage medium includes instructions, executable by a computer, to receive a selection of an interactive voice response (IVR) option. The selection of the IVR option is received from a first telecommunications terminal. The computer-readable storage medium also includes instructions, executable by the computer, to activate an IVR system in response to receiving the selection of the IVR option. The computer-readable storage medium also includes instructions, executable by the computer, to receive a spoken message. The computer-readable storage medium also includes instructions, executable by the computer, to translate the spoken message into a short message service (SMS) text message.

In another particular embodiment, a system is disclosed that includes a short message service (SMS) gateway, an interactive voice response (IVR) system, and a translator. The SMS gateway receives a selection of an IVR option, where the selection of the IVR option is responsive to a first telecommunications terminal. The IVR system is activated in response to receiving the selection of the IVR option at the SMS gateway. The IVR system receives a spoken message, and the translator translates the spoken message into an SMS text message. The SMS text message is transmitted to a second telecommunications terminal via a wireless network.

In view of the foregoing, the present invention, through one or more of its various aspects, embodiments and/or specific features or sub-components, is thus intended to bring out one or more of the advantages that will be evident from the description. The present invention is described with frequent reference to interactive voice response (IVR). It is understood, however, that IVR is merely an example of a specific embodiment of the present invention, which is directed broadly to converting speech to text within the scope of the invention. The terminology, examples, drawings and embodiments, therefore, are not intended to limit the scope of the invention.

Short message service (SMS) is a service available on most digital mobile phones. The service permits the sending of short messages (also known as SMSes, text messages, messages, or more colloquially texts or even txts) between mobile phones, other handheld devices and even landline telephones. The first SMS is believed to have been sent in December 1992 by Neil Papworth of Sema Group from a personal computer (PC) to a mobile phone on the Vodafone GSM network in the United Kingdom.

Short message service is a globally accepted wireless service that enables the transmission of alphanumeric messages between mobile subscribers and external systems such as electronic mail, paging, and voice-mail systems. SMS was originally designed as part of the Global System for Mobile Communications (GSM) digital mobile phone standard, but is now available on a wide range of networks, including 3G networks.

The service makes use of a short messaging service center (SMSC), which acts as a store-and-forward system for short messages. The wireless network provides the mechanisms required to find the destination station(s) and transports short messages between the SMSCs and wireless stations. In contrast to other existing text-message transmission services such as alphanumeric paging, the service elements are designed to provide guaranteed delivery of text messages to the destination. Additionally, SMS supports several input mechanisms that allow interconnection with different message sources and destinations.

SMS is characterized by out-of-band packet delivery and low-bandwidth message transfer to provide a highly efficient means for transmitting short bursts of data. A distinguishing characteristic of SMS is that an active mobile handset is able to receive or submit a short message at any time, independent of whether a voice or data call is in progress (in some implementations, this may depend on the mobile switching center (MSC) or SMSC capabilities). SMS also guarantees delivery of the short message by the network. Temporary failures due to unavailable receiving stations are identified, and the short message is stored in the SMSC until the destination device becomes available.

Initial applications of SMS focused on obsolescing alphanumeric pagers by permitting two-way general-purpose messaging and notification services, primarily for voice mail. As technology and networks evolved, a variety of services have been introduced, including e-mail, fax, and paging integration, interactive banking, information services such as stock quotes, and integration with Internet-based applications.

Wireless data applications include downloading subscriber identity module (SIM) cards for activation, debit, profile-editing purposes, wireless points of sale (POSs), and other field-service applications such as automatic meter reading, remote sensing, and location-based services. Additionally, integration with the Internet spurred the development of Web-based messaging and other interactive applications such as instant messaging, gaming, and chatting.

Interactive voice response, or IVR, is a computerized system that allows a person, typically a telephone caller, to select an option from a voice menu and otherwise interface with a computer system by voice. Generally the system plays pre-recorded voice prompts to which the person presses a number on a telephone keypad to select the option chosen, or speaks simple answers such as "yes", "no", or numbers in answer to the voice prompts. The latest systems use natural language speech recognition to interpret the questions that the person wants answered or to process the spoken responses.

Recent innovations include the ability to speak complex and dynamic information such as an e-mail, news report or weather information using Text-To-Speech (TTS). TTS is computer generated synthesized speech and is no longer the robotic voice people associate with computers. Real voices are used to create the speech in tiny fragments that are automatically spliced together before being played to the caller.

IVR systems are used to create and manage many services, including, for example, telephone banking, purchase order placement, caller identification and routing, balance inquiry, and airline ticket booking. Voicemail systems are different from IVR systems in that they are a one-way communication tool (the caller leaves a message) whereas IVR systems attempt two-way interaction with the caller. ACD systems are often the first point of contact when calling many larger businesses, and can be used in place of more expensive IVR systems. IVR systems are generally used at the front end of call centers to identify what service the caller wants and to extract numeric information such as account numbers as well as provide answers to simple questions such as account balances or allow pre-recorded information to be heard.

IVR call flows are created in a variety of ways. Older systems depended upon proprietary programming or scripting languages. More recent systems are structured similar to WWW pages, using the VoiceXML or SALT (http://www.saltforum.org/speechtek05/) language. This allows any Web server to act as an application server, freeing the developer to focus on the call flow. IVR system development no longer requires specialized programming skills. Virtually any Web developer already has all the tools needed to create an IVR call flow.

Speech recognition technologies allow computers equipped with a source of sound input, such as a microphone, to interpret human speech, e.g. for transcription or as an alternative method of interacting with a computer. Speech recognition technology is increasingly used for telephone applications. Typical telephone applications include travel booking and information, financial account information, customer service call routing, and directory assistance.

Using constrained grammar recognition, such applications can achieve remarkably high accuracy. Research and development in speech recognition technology continues to grow as the cost for implementing such voice-activated systems has dropped and the usefulness and efficacy of the systems has improved. For example, recognition systems optimized for telephone applications often supply information about the confidence of a particular recognition, and if the confidence is low, it can trigger the application to prompt callers to confirm or repeat their request (for example "I heard you say 'billing', is that right?").

Furthermore, speech recognition enables the automation of certain applications. For example, directory assistance and other systems now allow callers to "dial" by speaking names listed in an electronic phone book. Nevertheless, push-button systems are still much less expensive to implement and operate.

Speech recognition systems can be classified as to whether:
(1) they require the user to "train" the system to recognize their own particular speech patterns or not;
(2) the system is trained for one user only or is speaker independent;
(3) the system can recognize continuous speech or requires users to break up their speech into discrete words;
(4) the system is intended for clear speech material, or is designed to operate on distorted transfer channels (e.g., cellular phones) and possibly background noise or another speaker talking simultaneously; and
(5) the vocabulary the system recognizes is small (in the order of tens or at most hundreds of words), or large (thousands of words).

An important application of speech recognition is dictation, which transcribes the spoken words to text. There are many commercially available speech recognition dictation solutions available and which may be found by searching with selected key words on any well known search engine.

FIG. 1 is schematic drawing of a specific exemplary embodiment of an IVR SMS messenger system of the present disclosure. Wireless service provider 10 provides telecom services to the subscriber of wireless terminal 12 via wireless service tower 14. The subscriber accesses SMS messaging gateway 16, which provides an IVR option 18 that may be selected by the subscriber through, for example, a menu display on terminal 12. Alternative embodiments provide an audio menu in which selections may be made by speaking or pressing a terminal button in response to a prompt. With the IVR activated, the subscriber responds to IVR prompts which include, for example, indicating the destination of the message and a prompt to speak a message into the terminal.

In various embodiments, the destination may be indicated by one or more designation, such by the phone number of the destination or by the name, or nickname, of a user of the destination terminal. The message is brief enough to be accommodated by the SMS system. Specific embodiments provide a confirmation feature in which the IVR speaks back the message for confirmation by the subscriber, allows the subscriber to make any desired corrections, and finalizes the message content.

The spoken message, input through IVR 18, is converted to text by translator 20. A command to send or transmit the message initiates a communication protocol so that the message is sent through network 10 and tower 14 to terminal 22 for receipt by a user of terminal 22. Various embodiments provide scheduling features so that the message may be sent on a delayed basis at a specified time or after a selected period of time after confirmation or translation of the message. Communication protocols for the present disclosure include Internet Protocol, GSM, and others.

Further embodiments provide TTS capabilities for the message recipient, at terminal 22, so that the recipient of the message may elect to have the message spoken by terminal 22 rather than, or in addition to, reading the message in text form. Such embodiments may be programmed to read a message in the present disclosure automatically or, alternatively, upon manual selection of the option. Such features may be useful in a circumstance, for example, when the message recipient is driving or is otherwise indisposed to read the message when it arrives at terminal 22.

Alternative embodiments are adapted for use with traditional wireline phones 24, so that the caller calls the wireless service provider's IVR system via traditional public switched telephone network (PSTN) 26, enters the destination number and speaks the message to be sent. The sent message is transmitted through PSTN 26 to wireless network 10 to ultimately be received by terminal 22.

In accordance with various embodiments, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. The present disclosure is considered to include a tangible storage medium or distribution medium, as listed herein and including art-recognized equivalents and successor media, in which the software implementations herein are stored.

Accordingly, those skilled in the art will recognize that the present disclosure extends to computer readable media ("CRM") contain instructions for execution by a computer. CRM is broadly defined to include any kind of computer memory such as floppy disks, conventional hard disks, CD-ROMs, Flash ROMs, nonvolatile ROM, RAM, Storage Media, email attachments, solid state media, magnetic media, and signals containing instructions, together with processors to execute the instructions.

The invention has been described with reference to several exemplary embodiments. It is understood, however, that the words that have been used are words of description and illustration, rather than words of limitation. Changes may be made within the purview of the appended claims, as presently stated and as amended, without departing from the scope of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A method comprising:
   receiving a selection of an interactive voice response option, wherein the selection of the interactive voice response option is received from a first telecommunications terminal;
   receiving, at an interactive voice response system, a first spoken message after receiving the selection of the interactive voice response option; and
   transmitting a confirmation message associated with a short message service text message, wherein the first spoken message is translated into the short message service text message.

2. The method of claim 1, further comprising communicating a prompt to the first telecommunications terminal prior to receiving the first spoken message at the interactive voice response system.

3. The method of claim 1, further comprising transmitting the short message service text message to a second telecommunications terminal.

4. The method of claim 3, wherein the short message service text message is sent to the second telecommunications terminal at a predetermined time after translation of the first spoken message.

5. The method of claim 1, wherein the confirmation message is transmitted from the interactive voice response system to the first telecommunications terminal, and wherein the confirmation message is transmitted in response to the first spoken message being translated into the short message service text message.

6. The method of claim 5, wherein the confirmation message includes an audio version of the short message service text message.

7. The method of claim 6, further comprising transmitting the short message service text message to a second telecommunications terminal conditioned on receiving a first user confirmation from the first telecommunications terminal associated with the audio version of the short message service text message.

8. The method of claim 6, further comprising:
   receiving, at the interactive voice response system, an indication that the audio version of the short message service text message is not to be transmitted;
   receiving, at the interactive voice response system, a second spoken message; and
   transmitting a second audio version of a second short message service text message from the interactive voice response system to the first telecommunications terminal, wherein the second short message service text message includes a translated version of the second spoken message.

9. The method of claim 8, further comprising transmitting the second short message service text message to a second telecommunications terminal conditioned on receiving a second user confirmation indicating that the second audio version of the second short message service text message is to be transmitted to the second telecommunications terminal.

10. The method of claim 1, further comprising:
    receiving a destination associated with a second telecommunications terminal; and
    transmitting the short message service text message to the destination associated with the second telecommunications terminal.

11. The method of claim 10, wherein the destination includes at least one of a phone number, a name, and a nickname.

12. The method of claim 1, wherein the selection of the interactive voice response option is received via a short message service gateway coupled to a wireless network, and wherein first spoken message is received at the interactive voice response system via the wireless network.

13. The method of claim 1, wherein the selection of the interactive voice response option is received at the interactive voice response system via a public switched telephone network, and wherein the first spoken message is received at the interactive voice response system via the public switched telephone network.

14. The method of claim 13, wherein the short message service text message is transmitted to a second telecommunications terminal via a wireless network, wherein the interactive voice response system is included in a server coupled to the wireless network.

15. The method of claim 14, wherein the wireless network includes one of an internet protocol network and a global system for mobile communications network.

16. A non-transitory computer-readable storage medium comprising:
   instructions, executable by a computer, to receive a selection of an interactive voice response option, wherein the selection of the interactive voice response option is received from a first telecommunications terminal;
   instructions, executable by the computer, to receive a spoken message after receiving the selection of the interactive voice response option; and
   instructions, executable by the computer, to transmit a confirmation message associated with a short message service text message, wherein the spoken message is translated into the short message service text message.

17. The non-transitory computer-readable storage medium of claim 16, further comprising:
   instructions, executable by the computer, to transmit a menu display to the first telecommunications terminal, wherein the interactive voice response option is included in the menu display.

18. The non-transitory computer-readable storage medium of claim 16, further comprising:
   instructions, executable by the computer, to transmit an audio menu to the first telecommunications terminal, wherein the interactive voice response option is included in the audio menu, and
   wherein the selection of the interactive voice response option is detected using speech recognition.

19. The non-transitory computer-readable storage medium of claim 16, further comprising:
   instructions, executable by the computer, to transmit an audio menu to the first telecommunications terminal, wherein the interactive voice response option is included in the audio menu,
   wherein the interactive voice response option is selectable in response to a pressed terminal button at the first telecommunications terminal.

20. A system comprising:
   a processor configured to:
      receive a selection of an interactive voice response option, wherein the selection of the interactive voice response option is received from a first telecommunications terminal;
      receive a spoken message, wherein an interactive voice response component is activated in response to receiving the selection of the interactive voice response option;
      transmit a confirmation message associated with a short message service text message, wherein the spoken message translated into the short message service text message; and
      transmit the short message service text message to a second telecommunications terminal via a wireless network.

* * * * *